United States Patent
Ukita et al.

(10) Patent No.: US 6,373,791 B1
(45) Date of Patent: Apr. 16, 2002

(54) INFORMATION REPRODUCING APPARATUS, INFORMATION REPRODUCING METHOD, AND PROGRAM STORAGE MEDIUM

(75) Inventors: Yoshitaka Ukita, Tokyo; Masakazu Hattori, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/697,488

(22) Filed: Oct. 26, 2000

(30) Foreign Application Priority Data

Oct. 27, 1999 (JP) .................................. 11-305176

(51) Int. Cl.⁷ ................................................ H04B 1/20
(52) U.S. Cl. ................................. 369/6; 455/527; 369/2
(58) Field of Search ........................... 369/2, 6; 455/527

(56) References Cited

U.S. PATENT DOCUMENTS

| | | | | |
|---|---|---|---|---|
| 4,605,975 A | * | 8/1986 | Beaman | 369/2 |
| 5,321,671 A | * | 6/1994 | Yoshida | 369/6 |
| 5,365,500 A | * | 11/1994 | Park | 369/2 |
| 5,379,279 A | * | 1/1995 | Backof et al. | 455/527 |
| 6,181,956 B1 | * | 1/2001 | Koskan | 455/566 |

FOREIGN PATENT DOCUMENTS

| | | | | |
|---|---|---|---|---|
| EP | 91-457492 | * | 11/1991 | 369/6 |
| JP | 63-308764 | * | 12/1988 | 369/6 |

* cited by examiner

*Primary Examiner*—Aristotelis M. Psitos
(74) *Attorney, Agent, or Firm*—Frommer Lawrence & Haug LLP; William S. Frommer (57) ABSTRACT

Listening to a CD by using headphones for example is interrupted by voice signals. A control microcomputer 55 executes a procedure for establishing a connection for communication with a communication unit. When the connection has been established, the control microcomputer 55 sets a switch 59 from a terminal a for supplying, to headphones 22, the reproduction output of a CD 23 to a terminal b for supplying a voice signal received at an antenna 21 to the headphones 22.

6 Claims, 7 Drawing Sheets

INFORMATION REPRODUCING APPARATUS, INFORMATION REPRODUCING METHOD, AND PROGRAM STORAGE MEDIUM

BACKGROUND OF THE INVENTION

The present invention relates generally to an information reproducing apparatus, an information reproducing method, and a program storage medium and, more particularly, to an information reproducing apparatus, an information reproducing method, and a program storage medium that are adapted to accept interruptions from the outside the information reproducing apparatus.

Recent popularization of stereo headphones easily allows people to listen to radio and music for example even in vehicles and while walking.

However, use of stereo headphones makes it difficult to hear the sounds coming from the outside the headphones, which may make calling by someone or in-vehicle broadcast unnoticed by the user of headphones.

The stereo headphones installed in particular places such as on the passenger seats of airliners and trains are predesigned to accept the interruption of in-vehicle broadcast, thereby preventing the risk of letting the broadcast unnoticed by the passengers using headphones.

However, the installations of interruption accepting headphones are limited to such particular places as mentioned above. This interruption accepting capability has not been realized in the stereo headphones designed to be owned by general consumers and for use in general places.

SUMMARY OF THE INVENTION

It is therefore an object of the present invention to provide an information reproducing apparatus, an information reproducing method, and a program storage medium that allow stereo headphones to be interrupted from the outside with ease and in a wider range while the user is listening to music or radio in any place.

In carrying out the invention and according to one aspect thereof, there is provided an information reproducing apparatus for reproducing data stored in a recording medium loaded in the information reproducing apparatus, comprising: a connecting means for executing a connection procedure for making connection with a communication device; a receiving means for receiving data supplied from the communication device on the basis of a result obtained by the execution of the connection procedure by the connecting means; a sending means for sending a notification to the communication device of an acceptance of the connection on the basis of the result obtained by the execution of the connection procedure by the connecting means; and a switching means for switching, when the sending of the notification by the sending means has completed, an output of the information reproducing apparatus from data reproduced from the recording medium to data received by the receiving means.

An information reproducing apparatus according to another aspect of the present invention may further include selecting means for selecting whether or not the connection procedure by connecting means will be executed, wherein a sending means sends a notification to a communication device on the basis of a result of the selection made by the selecting means.

The data reproduced from the recording medium and the data supplied from the communication device are voice data.

The data reproduced from the recording medium and the data supplied from the communication device are image data.

In carrying out the invention and according to still another aspect thereof, there is provided an information reproducing method comprising the steps of: executing a connection procedure for making connection with a communication device; receiving data supplied from the communication device on the basis of a result obtained by the execution of the connection procedure by the connecting means; sending a notification to the communication device of an acceptance of the connection on the basis of the result obtained by the execution of the connection procedure by the connecting means; and switching, when the sending of the notification by the sending means has completed, an output of the information reproducing apparatus from data reproduced from the recording medium to data received by the receiving means.

In carrying out the invention and according to still another aspect thereof, there is provided a program storage medium storing a computer-readable program comprising the steps of: executing a connection procedure for making connection with a communication device; receiving data supplied from the communication device on the basis of a result obtained by the execution of the connection procedure by the connecting means; sending a notification to the communication device of an acceptance of the connection on the basis of the result obtained by the execution of the connection procedure by the connecting means; and switching, when the sending of the notification by the sending means has completed, an output of the information reproducing apparatus from data reproduced from the recording medium to data received by the receiving means.

As described and according to the information reproducing apparatus, the information reproducing method, and the program storage medium associated with the present invention, a procedure for connection between a communication device and an information reproducing device is executed and, on the basis of the result of this execution, the information reproducing device receives data from the communication device. When, on the basis of the result of the connection procedure, the acceptance of connection is sent from the information reproducing device to the communication device, the output to the headphones is switched from the data to be reproduced from a recording medium to the data received from the communication device.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

Figure 1:
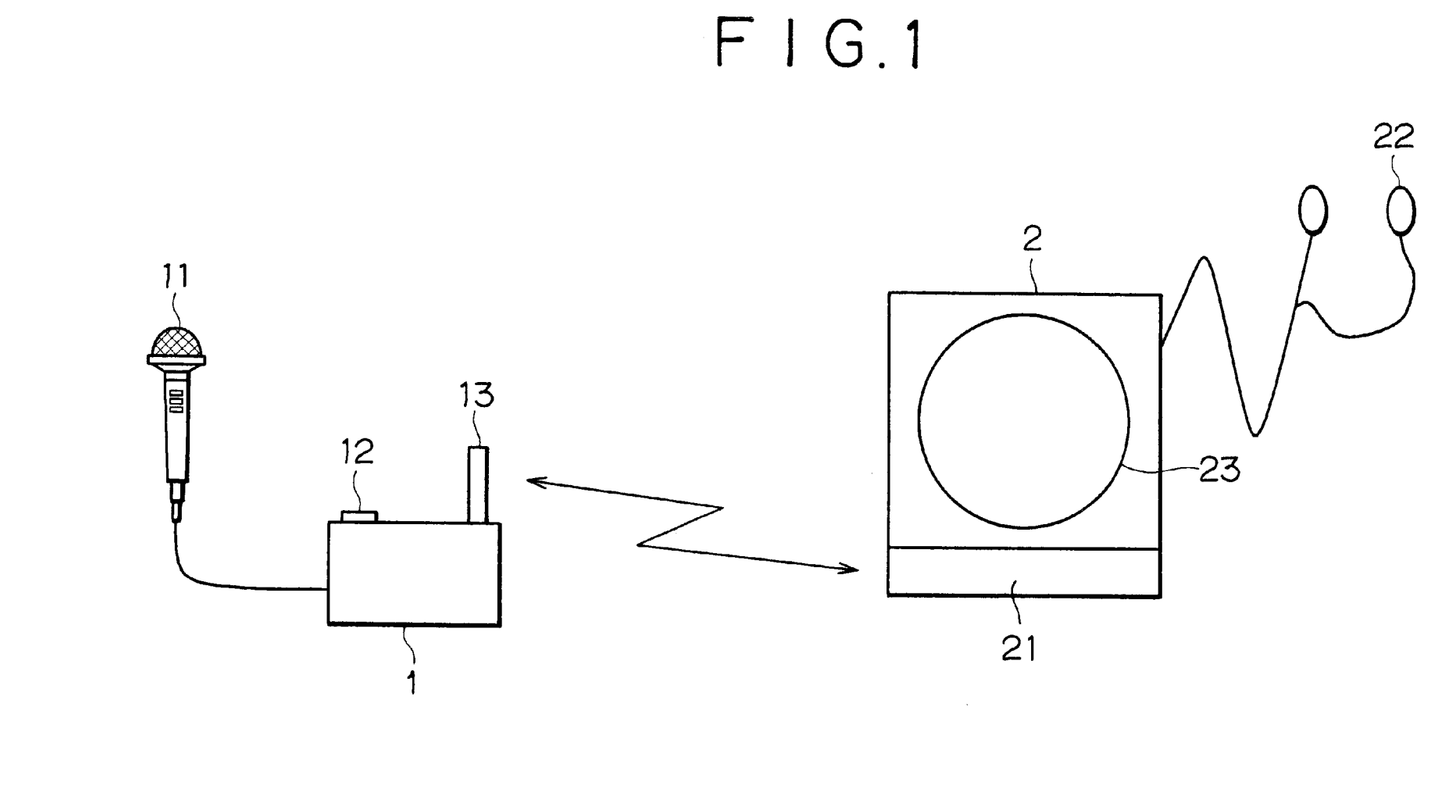
FIG. 1 is a schematic diagram illustrating a configuration of an information processing system practiced as one embodiment of the invention.

Now, referring to FIG. 1, there is shown a configuration of an information processing system practiced as one embodiment of the present invention. This system is composed of a communication unit 1 and a CD (Compact Disk) player 2. To send a voice inputted in a peripheral device, a user of the communication unit 1 presses a microphone button 12 to input a voice through a microphone 11. To end the transmission of the voice, the user presses the microphone button 12 again. The communication unit 1 modulates the inputted voice into a signal of a predetermined scheme and outputs the signal from an antenna 13 as radio wave. The antenna 13 also receives radio wave sent from the CD player 2.

The CD player 2 demodulates the radio wave received at the antenna 21 to output a result voice from the headphones 22 or reproduces music data recorded on a CD 23 loaded in the CD player 2 to output music from the headphones 22.

Communication between the communication unit 1 and the CD player 2 is executed by a wireless communication scheme based on Bluetooth (trademark), one of wireless communication standards. Although only one unit of CD player, the CD player 2, is shown in FIG. 1, it will be apparent that two or more CD Players may be arranged.

Figure 2:
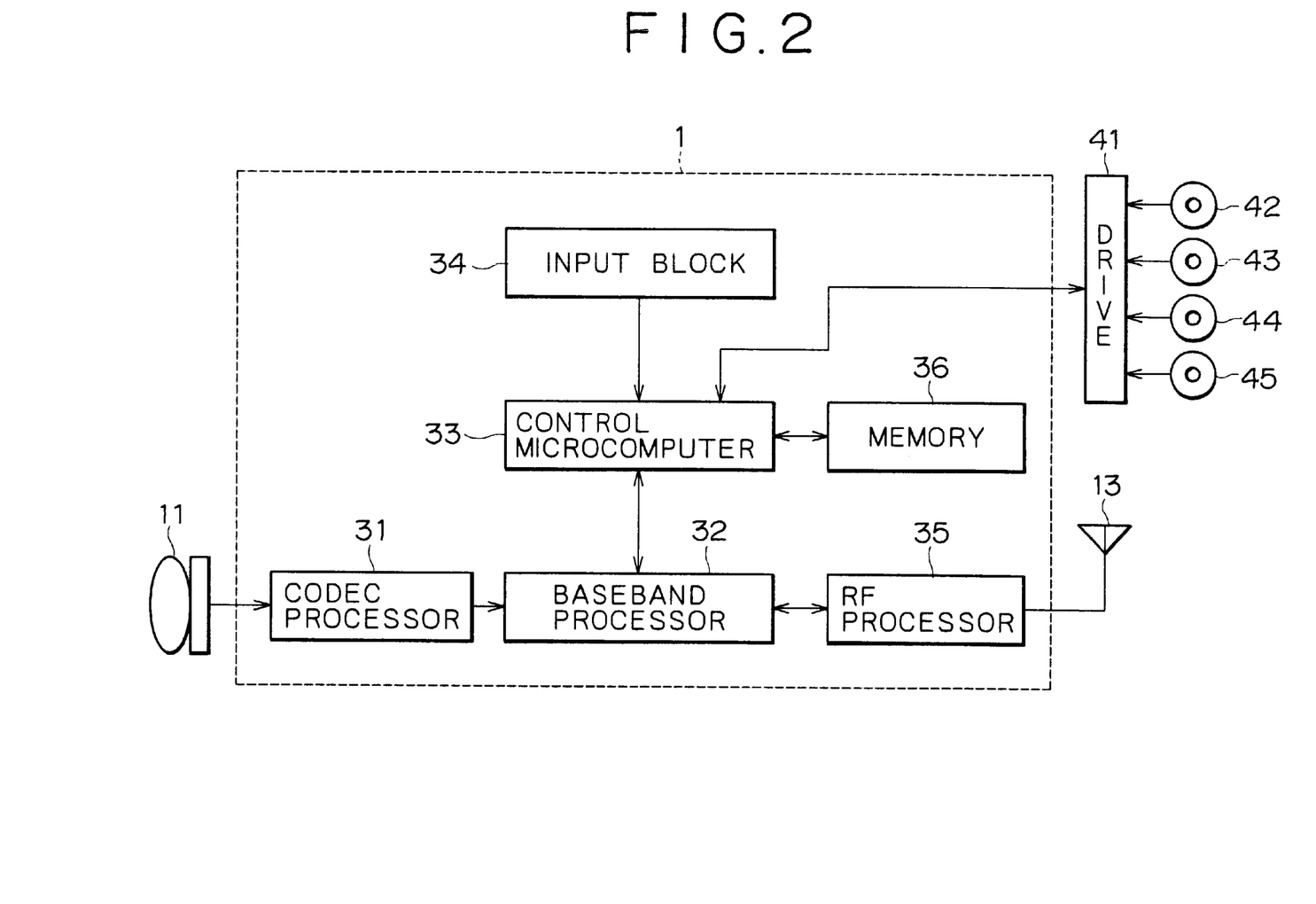
FIG. 2 is a block diagram illustrating a configuration of a communication unit 1 shown in FIG. 1.

Referring to FIG. 2, there is shown an internal configuration of the communication unit 1. User's voice is inputted through the microphone 11 to be supplied to a CODEC processor 31. The CODEC processor 31 converts the inputted voice signal, which is an analog signal, into a digital signal, encodes it into a format for communication, and supplies the resultant signal to a baseband processor 32.

In the voice communication based on Bluetooth, 64 kbps CVSD (Continuous Variable Slope Delta) modulation format or 64 kbps A-law or $\mu$-law is used.

The baseband processor 32 packetizes the inputted voice signal into a Bluetooth communication packet on the basis of a command issued from a control microcomputer 33, executes error correction coding on the Bluetooth communication packet, and outputs the error-corrected packet to an RF (Radio Frequency) processor 35. The baseband processor 32 also executes error correction coding on received data inputted through the RF processor 35. If the data cannot be correctly received by the baseband processor 32, a message for requesting the resending of the data is sent to the CD player 2.

The RF processor 35 converts the voice data and communication data supplied from the baseband processor 32 into analog wireless data and sends them to CD player 2 through the antenna 13. In addition, the RF processor 35 demodulates the communication data received at the antenna 13, converts the demodulated data from analog to digital, and outputs the digital data to the baseband processor 32.

An input block 34 generates a predetermined signal corresponding to an operation of the microphone button 12 by the user and outputs the generated signal to the control microcomputer 33.

The control microcomputer 33 reads a program from a memory 36 as required and executes processing accordingly. For example, on the basis of a signal corresponding to a user operation supplied from the input block 34, the control microcomputer 33 reads a corresponding program from the memory 36, selects a predetermined one of the plurality of CD players 2, and executes a procedure for establishing the connection with the selected CD player 2 (a particular example of this execution will be described later). When the connection with the CD player 2 has been established, the control microcomputer 33 controls the baseband processor 32 and sends voice data to the CD player 2 via the RF processor 35 and the antenna 13.

The program to be executed by the control microcomputer 33 is stored in the memory 36 beforehand or loaded from a magnetic disk 42, an optical disk 43, a magneto-optical disk 44, or a semiconductor memory 45 for example driven by a detachably connected drive 41.

Figure 3:
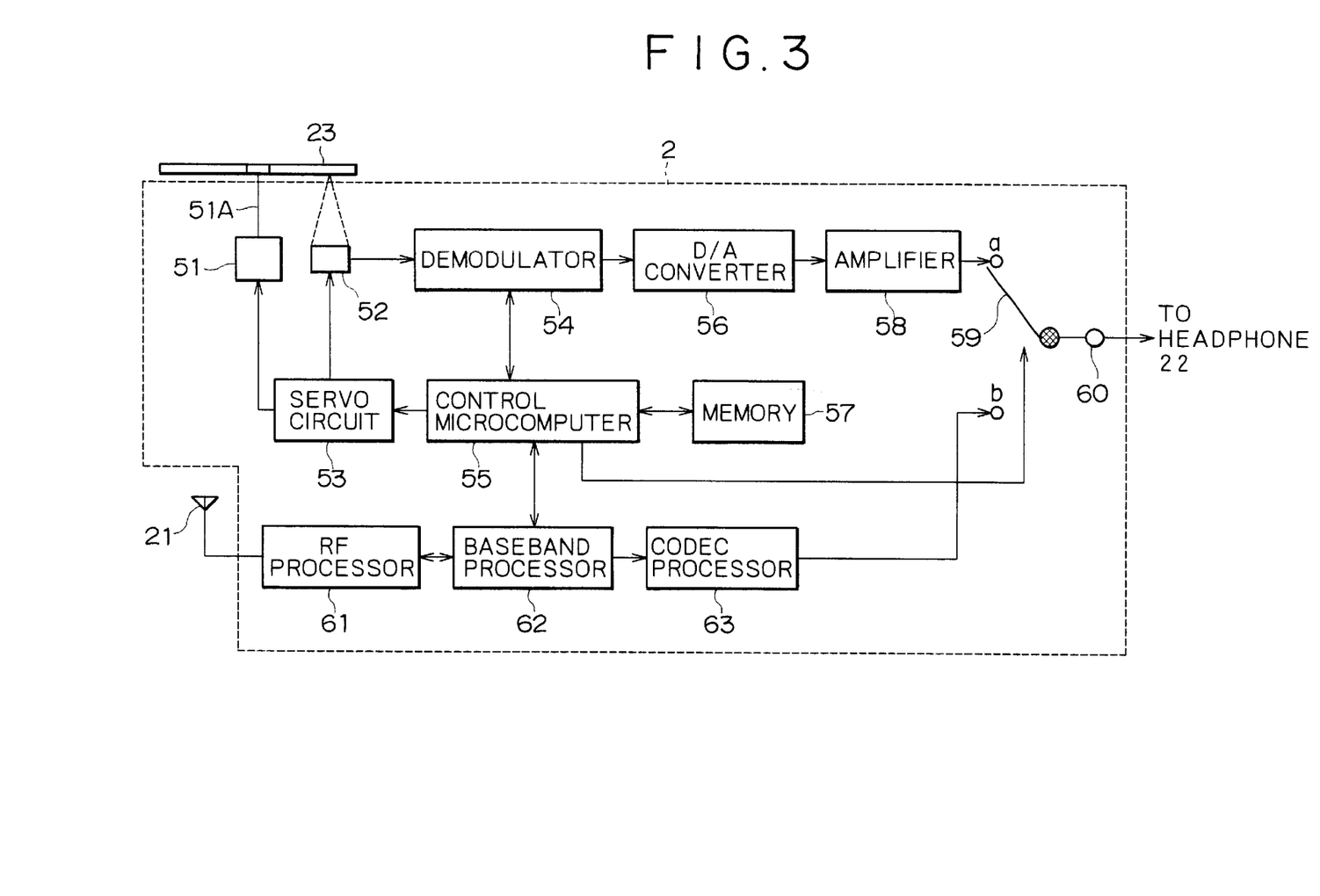
FIG. 3 is a block diagram illustrating a configuration of a CD player 2 shown in FIG. 1.

Referring to FIG. 3, there is shown an internal configuration of the CD player 2. The CD 23 is attached to a spindle 51A which is driven by a spindle motor 51 at a predetermined rotational speed. A pickup 52 radiates a light beam from an incorporated laser diode (not shown) onto the signal surface of the CD 23, reading data by the reflected light. The pickup 52 is moved by a servo circuit 53 in the radial direction of the CD 23. The servo circuit 53 controls the spindle motor 51 and the pickup 52 on the basis of a command issued by a control microcomputer 55.

A demodulator 54, under the control of the control microcomputer 55, EFM-demodulates data read by the pick 52, executes error correction coding on the demodulated data, and outputs the resultant data to a D/A converter 56. The D/A converter 56 converts the inputted data from digital to analog and outputs the digital data to an amplifier 58. The amplifier 58 amplifies the inputted data and outputs the amplified data to the headphones 22 via a switch 59 and a headphone jack 60, upon which the music data are reproduced.

The switch 59, according to a command issued by the control microcomputer 55, is set so as to select a terminal a for reproducing the music data supplied from the CD 23 or a terminal b for reproducing the voice data supplied from the communication unit 1 (the microphone An RF processor 61 demodulates the communication data and voice data received at the antenna 21, converts these data from analog to digital, and outputs the digital data to a baseband processor 62. In addition, the RF processor 61 converts data (a packet) for communication supplied from the baseband processor 62 to analog wireless data, and sends them to the communication unit 1 via the antenna 21.

The baseband processor 62 executes error correction coding on the communication data supplied from the RF processor 61. If the baseband processor 62 could not correctly receive the data, the baseband processor 62 sends a message for requesting the resending of the data to the communication unit 1. In addition, the baseband processor 62, according to a command issued by the control microcomputer 55, packetizes communication data into a Bluetooth communication packet, executes error correction coding on the packet, and outputs the resultant packet to the RF processor 61.

Further, the baseband processor 62 outputs the voice data supplied from the RF processor 61 to a CODEC processor 63. The CODEC processor 63 demodulates the inputted voice data, converts the demodulated data from digital to analog, and outputs the analog data to the headphones 22 via the switch 59 and the headphone jack 60, upon which the voice data are reproduced.

On the basis of a command (for example, a command for reproducing music data stored in the CD 23) issued by the user, the control microcomputer 55 controls the servo circuit 53, the demodulator 54, the switch 59, and the baseband processor 62 and so on. In addition, the control microcomputer 55 sends the data (unique ID and so on) of the CD player 2 itself stored in a memory 57 to the communication unit 1 in a procedure for establishing the connection with the communication unit 1 (of which particular example will be described later). When the connection has been established, the control microcomputer 55 sets the switch 59 to the terminal b so that the voice data supplied from the communication unit 1 are outputted to the headphone jack 60.

At this moment, the CD player 2 functions not as music reproduction but as wireless headphones of the communication unit 1.

Figure 4:
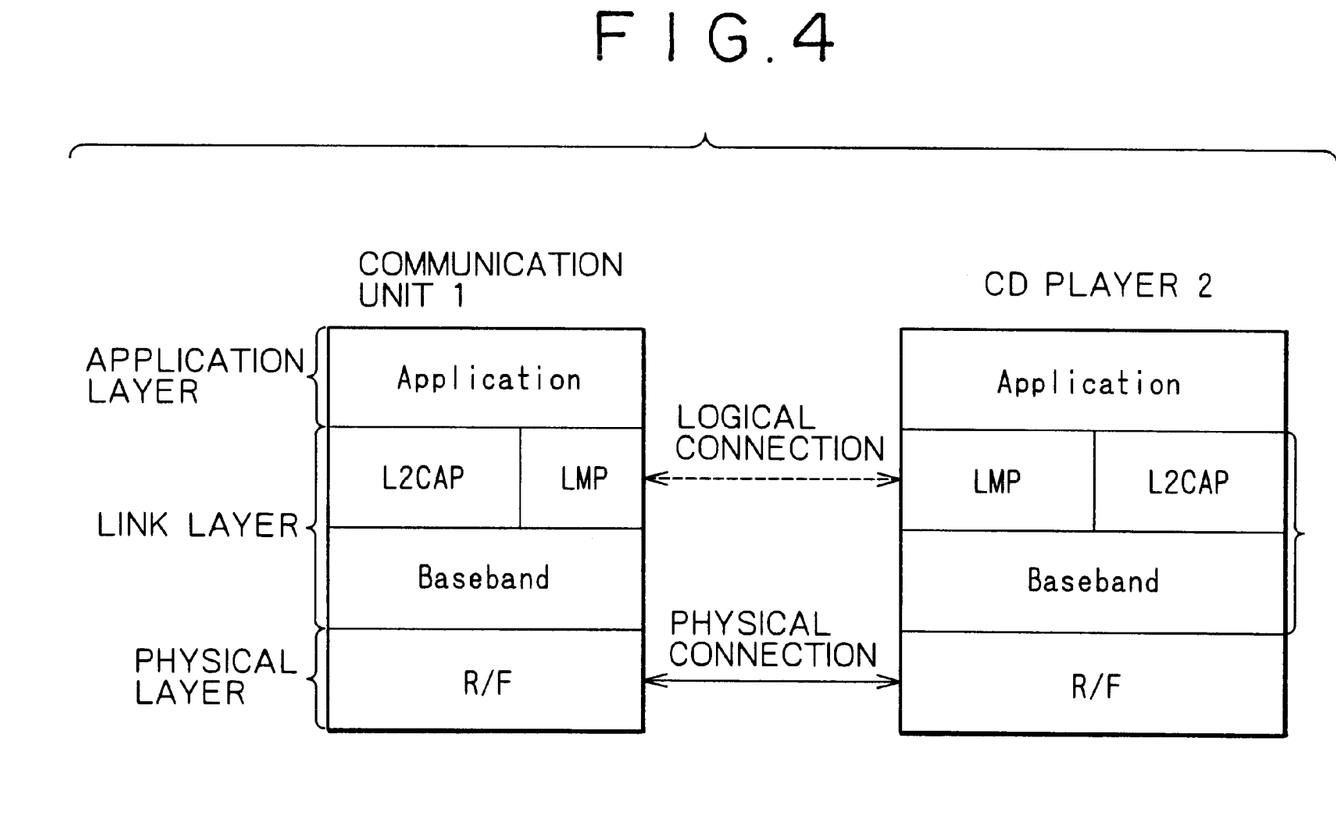
FIG. 4 is a diagram illustrating communication protocol stacks.

The following describes communication protocol stacks for communication between the Bluetooth-based communication unit 1 and the CD player 2 with reference to FIG. 4. In the figure, upper modules are assumed to belong to higher layers.

An RF belonging to the physical layer converts digital data into analog data to send them via the antenna or converts analog data received via the antenna into digital data. To be more specific, according to a sequence formed by digital data 0s and 1s, executes primary modulation on the digital data, superimposes the modulated data onto a carrier using 2.4 GHz frequency band, and sends the resultant data. This carrier is always hopped in frequency by FHSS (Frequency Hopping Spread Spectrum) by which frequency change is made every time one piece of data (a time slot) is sent.

Thus, data are sent and received alternately every time slot, so that, in each receive slot, the carrier of 2.4 GHz frequency band is removed from the signal received at the antenna and the resultant signal is demodulated to obtain digital data consisting of a sequence of 0s and 1s. The frequency band of the carrier to be removed is always changed by the frequency hopping but the sequence of this frequency hopping is recognized in accordance with the other party of communication.

The baseband belonging to the link layer serves to execute control for requesting the resending of data. To be more specific, the sending side sends original data by adding various communication information such as error correction code and the receiving side returns a response indicative of whether the data have been correctly received or not. If the data have not been correctly received, the receiving side requests the sending side for the resending of the data. However, if the sending side sets a retry count and the data have not been received by the receiving side in excess of the retry count, the sending side stops the resending.

An LMP (Link Management Protocol) belonging to the link layer serves to control a link status with a destination of connection based on the Bluetooth communication. For example, the LMP executes the following control operations:

establishment and release of connection status;
mode control in accordance with presence or absence of data to be transferred and communication repetition;
switching between packet types in accordance with communication route status;
authentication whether to enable data communication or not; and
encryption for data communication.

This layer has two links; an ACL (Asynchronous Connectionless) link and an SCO (Synchronous Connection-Oriented) link.

The ACL link is for linking on a packet exchange basis and is used for the purpose of data communication and communication control. For example, when this link is established and a master device of the Bluetooth communication sends data, a slave device can respond to an inquiry (data) given by the master. However, because the master always has initiative, the slave cannot respond (reply) unless it receives some data (or a message) from the master.

The SCO link is for linking on a line exchange basis and is used for the purpose of mainly voice talk (or voice communication). For example, when this link is established, the slave holds a communication slot of an interval of a certain time. It should be noted that this communication slot is kept held when no communication is being carried out. Therefore, the slave can send data to the master if the slave does not receive data (or a message) from the master.

ACL link is used for the purpose of control and therefore essential between communicating Bluetooth devices. For voice communication, it is necessary to establish ACL link and then SCO link between Bluetooth devices.

L2CAP (Logical Link Control & Adaptation Protocol) belonging to the link layer serves to define logical channels. Physically, two Bluetooth devices are connected by one ACL link. Logically, two or more channels can be defined between two Bluetooth devices. This allows simultaneous transfer of various types of upper-protocol data. However, if the size of data supplied from an upper protocol is large, the data is divided into packets of a size defined in the baseband and these packets are sent to the receiving side. The receiving side integrates these packets into the original data.

The application of the communication unit 1 belonging to the application layer is used to search for a destination (the slave) of the transmission of voice data and communicate with the found destination. The application of CD player 2 is used to communicate with the master and, upon establishment of communication, make switching so that the received voice data are outputted.

Figure 5:
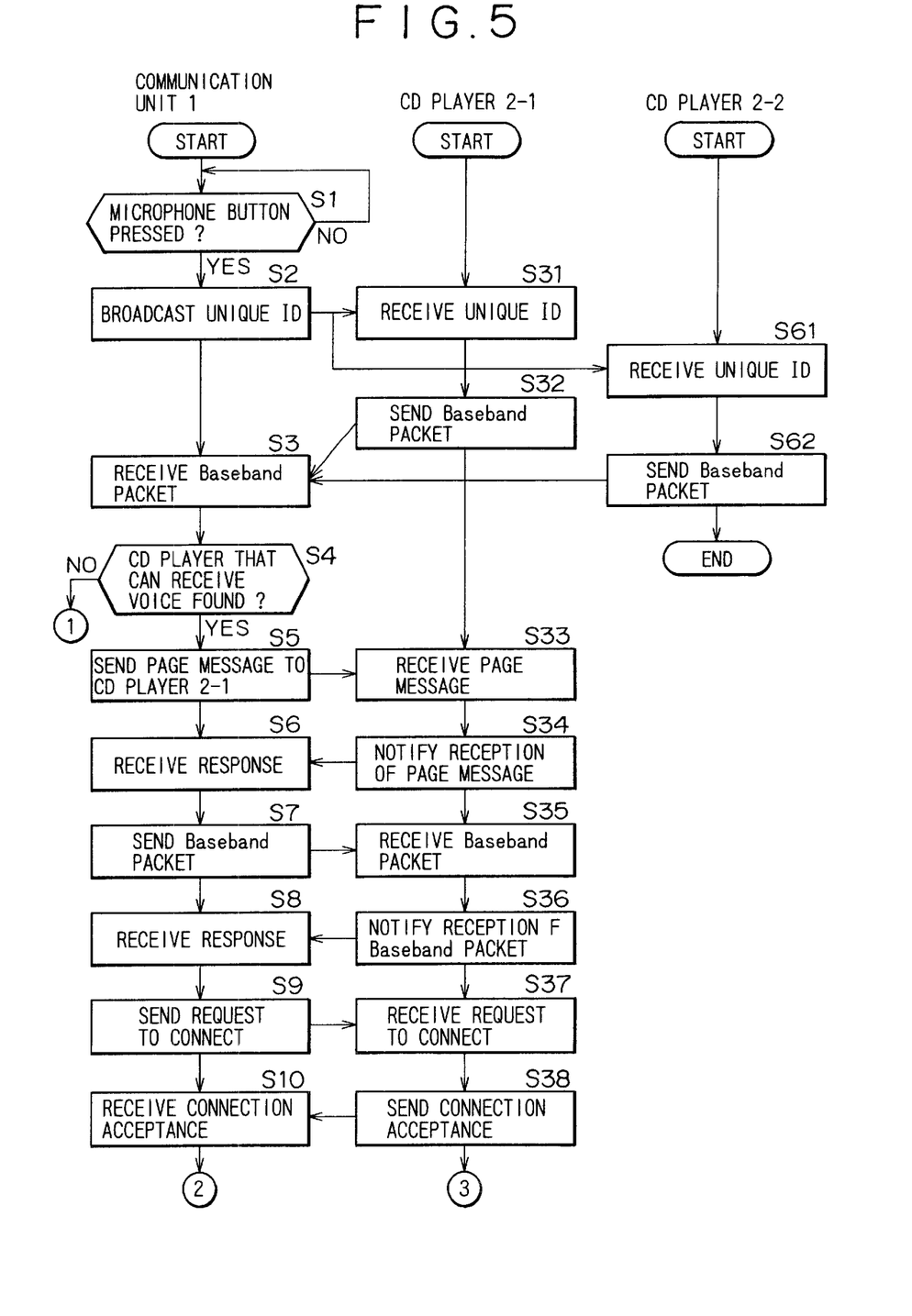
FIG. 5 is a flowchart describing a voice interruption processing.
Figure 6:
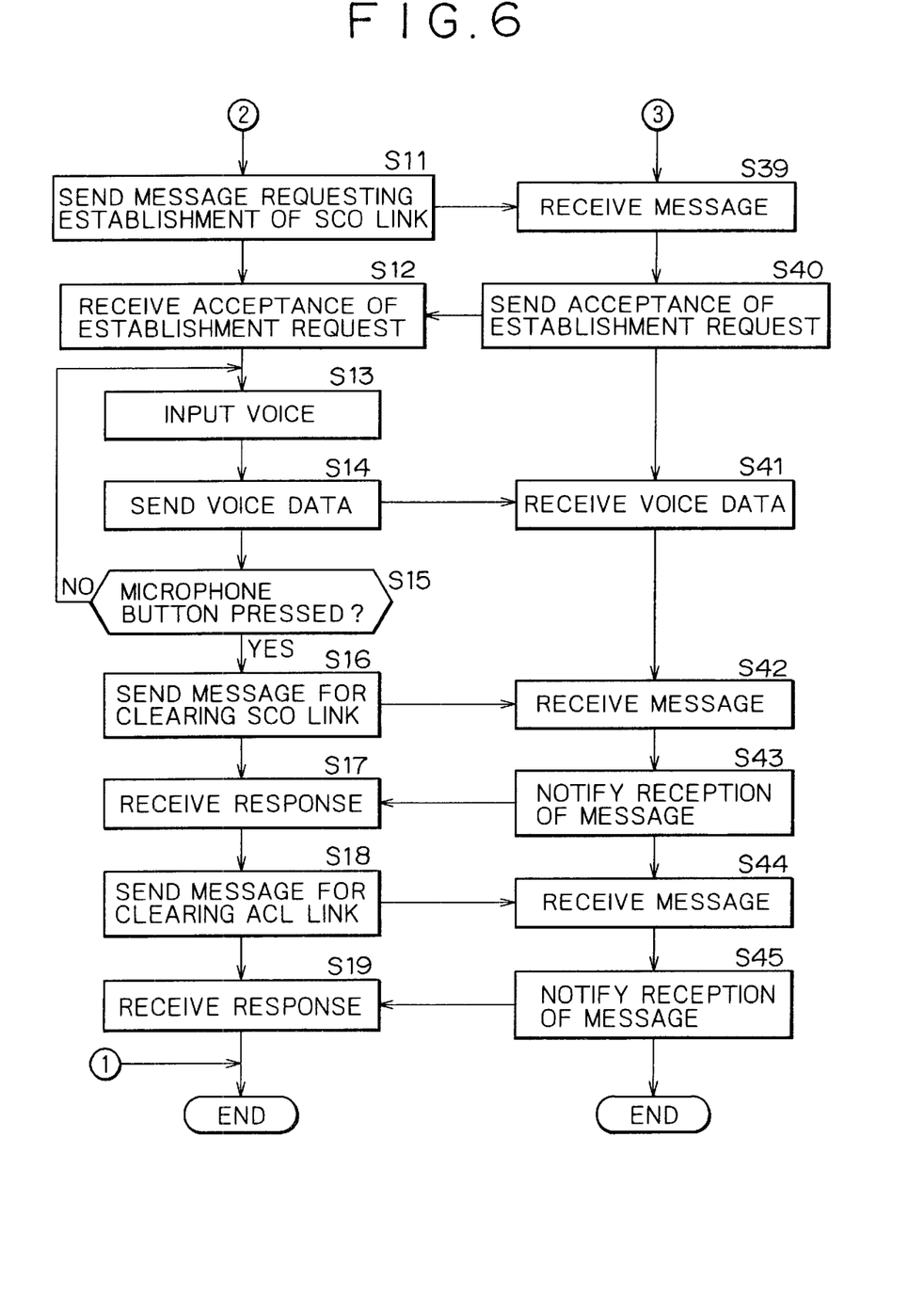
FIG. 6 is a flowchart continued from FIG. 5.

The following describes voice interruption processing to be executed by the communication unit 1 and the CD player 2 (in this example, the CD players 2-1 and 2-2) with reference to the flowcharts shown in FIGS. 5 and 6. In step S1, the control microcomputer 33 of the communication unit 1 determines, on the basis of a signal supplied from the input block 34, whether the microphone button has been pressed by the user. If the microphone button 12 is found not pressed, the control microcomputer 33 waits in step S1 until the decision becomes YES.

If the microphone button 12 is found pressed in step S1, then the control microcomputer 33 reads the unique ID of the communication unit 1 stored in the memory 36 in step S2 and sends the unique ID to the baseband processor 32 to include the unique ID into a baseband packet, which is then sent to the RF processor 35. The RF processor 35 converts the supplied data into analog wireless data and broadcasts the unique ID of the communication unit 1 via the antenna 13.

Figure 7:
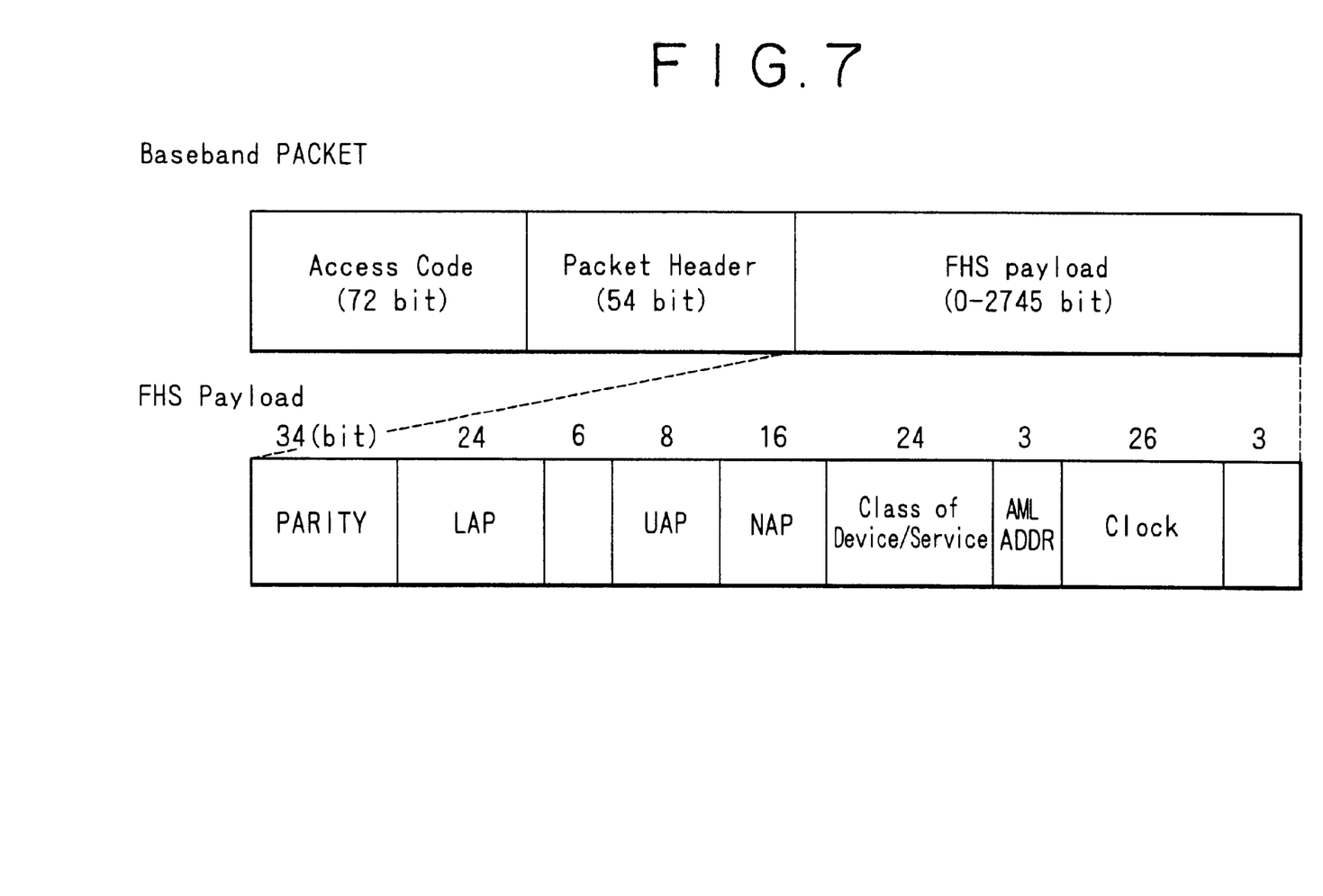
FIG. 7 is a diagram illustrating a baseband packet.

The following describes the baseband packet which is used in the Bluetooth communication at link establishment with reference to FIG. 7. The baseband packet includes a 72-bit access code, a 54-bit packet header, and an FHS (Frequency Hop Synchronization) payload.

The access code stores an address indicative of with which Bluetooth device this packet is associated. The packet header stores information associated with control of the Bluetooth communication. For example, this information includes packet type and resend request flag.

The FHS payload includes a 34-bit parity, a 24-bit LAP (Lower Address Part), an 8-bit UAP (Upper Address Part), a 16-bit NAP (Non-Significant Address Part), a 24-bit CoD (Class of Device/Service), and a 26-bit clock. The LAP, UAP, and NAP are generically called BD_ADDR (Bluetooth Device Address), its contents being specified in IEEE (The Institute of Electrical and Electronics Engineers)

802. The FHS also includes information for setting a resend request count to be used when a packet has not been received. Further, the FHS includes AM_ADDR (Active Member Address) to be assigned by the master to the slave. AM_ADDR denotes an address in a piconet.

The piconet denotes a star network formed around one master in the Bluetooth communication. Up to seven IDs can be assigned to one piconet.

Referring to FIG. 5. again, in the processing of step S2 for searching for a device for the Bluetooth communication, the access code of the baseband packet to be sent stores the addresses of all devices that can receive this packet.

In step S31, the antenna 21 of the CD player 2-1 receives the data (the baseband packet) sent from the communication unit 1. Then, the RF processor 61 demodulates the data received at the antenna 21, converts the demodulated data from analog to digital, and outputs the converted data to the baseband processor 62. In step S32, according to a command given by the control of the control microcomputer 55, the baseband processor 62 of the CD player 2-1 includes the unique ID of the CD player 2-1 itself and service contents provided by the CD player 2-1 (both stored in the memory 57) into a baseband packet and sends it to the communication unit 1.

In step S61, the CD player 2-2 receives the data sent from the communication unit 1. In step S62, the CD player 2-2 includes the unique ID of the CD player 2-2 itself and service contents provided by the CD player 2-2 into a baseband packet and sends it to the communication unit 1.

It should be noted that the baseband packets (namely, the FHS payloads) sent in steps S32 and S62 include BD_ADDR which is the absolute ID of each device assigned thereto and CoD indicative of the type of the device and service (function) contents of that device.

In step S3, the antenna 13 of the communication unit 1 receives the unique IDs and service contents sent from the CD players 2-1 and 2-2. Then, the RF processor 35 demodulates the data received at the antenna 13, converts the demodulated data from analog to digital, and outputs the digital data to the baseband processor 32. The baseband processor 32 executes error correction coding on the inputted data and sends the resultant data to the control microcomputer 33.

In step S4, the control microcomputer 33 of the communication unit 1 determines, on the basis of the service contents received in step S3, whether there is any CD player that can receive voice data. If any CD player that can receive voice data is found, then the control microprocessor 33 goes to step S5. If the CD player that can receive voice data is the CD player 2-1 for example, then the baseband processor 32 of the communication unit 1 sends a page message to the CD player 2-1 on the basis of the command given by the control microprocessor 33. This page message (or the baseband packet) includes, as an address, an access code based on the BD_ADDR of the CD player 2-1.

In step S33, the baseband processor 62 of the CD player 2-1 receives the page message sent via the antenna 21 and the RF processor 62. At this moment, the CD player 2-1 recognizes from the access code that this is a packet addressed to CD player 2-1. In step S34, the baseband processor 62 of the CD player 2-1 receives the page message from the communication unit 1 and notifies it of the reception of the page message.

In step S6, the baseband processor 32 of the communication unit 1 receives the response (indicative of the reception of the page message) from the CD player 2-1. In step S7, the baseband processor of the communication unit 1 sends a baseband packet to the CD player 2-1 on the basis of a command issued by the control microcomputer 33. This baseband packet (namely, the FHS payload) includes AM_ADDR (namely the ID in the piconet) indicative of the participation of the slave CD player 2-1 into the piconet with the communication unit 1 being the master, a sequence of the frequency hopping of the master, and clock phase information.

In step S35, the baseband processor 62 of the CD player 2-1 receives the baseband packet sent from the communication unit 1. At this moment, the CD player 2-1 recognizes from the access code that this packet is address to the CD player 2-1 and receives the ID in the piconet to which the CD player 2-1 belongs. In step S36, the baseband processor 62 of the CD player 2-1 receives the baseband packet sent from the communication unit 1 and notifies it of the reception of the baseband packet.

In step S8, the baseband processor 32 of the communication unit 1 receives the response (indicative of the reception of the baseband packet) sent from the CD player 2-1. In step S9, the baseband processor 32 of the communication unit 1 sends a request for connection to the CD player 2-1 on the basis of a command issued by the control microcomputer 33.

In step S37, the baseband processor 62 of the CD player 2-1 receives the request for connection sent from the communication unit 1. In step S38, the baseband processor 62 of the CD player 2-1 assigns a predetermined channel (namely, a logical channel) to the communication with the communication unit 1 on the basis of the command issued by the control microcomputer 55 and sends a response indicative of the acceptance of connection to the communication unit 1.

The above-mentioned example does not limit the CD player 2-1 to a particular mate of the connection. If the connection from only a particular mate of connection is allowed, a step of cross-authentication process is inserted between steps S37 and S38. For the cross authentication, ISO (International Organization for Standardization) 9798 for example is available.

In step S10, the baseband processor 32 of the communication unit 1 receives the connection acceptance response from the CD player 2-1 including data indicative of a channel to be used for communication.

Thus, the ACL link is established between the communication unit 1 and the CD player 2-1 by the processes of steps S1 through S10, steps S31 through S38, and steps S61 and S62, enabling the data communication on the application level.

Next, in step S11, on the basis of a command given by the control microcomputer 33, the baseband processor 32 of the communication unit 1, sends a message for requesting the establishment of an SCO link to the CD player 2-1.

In step S39, the baseband processor 62 of CD player 2-1 receives the message requesting the establishment of the SCO link from the communication unit 1. In step S40, on the basis of a command given by the control microcomputer 55, the baseband processor 62 of the CD player 2-1 sends a response of accepting the request for the SCO link establishment.

At this moment, the control microcomputer 55 of the CD player 2-1 sets the switch 59 to the terminal b so as to reproduce the voice data sent from the communication unit 1 (or the microphone 11). Consequently, the playing of the CD 23 sounded from the headphones 22 of the CD player 2-1 can be interrupted.

In step S12, the baseband processor 32 of the communication unit 1 receives the response of accepting the SCO link establishment sent from the CD player 2-1. In step S13, the user enters his or her voice through the microphone 11. In step S14, the CODEC processor of the communication unit 1 converts the inputted voice from analog to digital, encodes the digital data into the format for communication, and outputs the encoded data to the baseband processor 32. The baseband processor 32 sends the received voice data to the CD player 2-1 on the basis of a command given by the control microcomputer 33.

In step S41, the baseband processor 62 of the CD player 2-1 receives the voice data. Then, the CODEC processor 63 demodulates the inputted voice data, converts the demodulated voice data from digital to analog, and outputs the analog voice data to the headphones 22 through the switch 59 and the headphone jack 60, thereby reproducing the voice data.

In step S15, on the basis of a signal supplied from the input block 34, the control microcomputer 33 of the communication unit 1 determines whether the microphone button 12 has been pressed by the user. If the microphone button 12 is found not pressed, the control microcomputer 33 returns to step S13 to repeat the above-mentioned processes. If the microphone button 12 is found pressed in step S15, on the basis of a command given by the control microcomputer 33, the baseband processor 32 sends a message for clearing the SCO link to the CD player 2-1 in step S16.

In the S42, the baseband processor 62 of the CD player 2-1 receives the message for clearing the SCO link. In step S43, on the basis of a command given by the control microcomputer 55, the baseband processor 62 of the CD player 2-1 sends a response indicative of the reception of the SCO link clearing message to the communication unit 1.

In step S17, the baseband processor 32 of the communication unit 1 receives the response (indicative of the reception of the clearing of the SCO link) from the CD player 2-1. In step S18, on the basis of a command given by the control microcomputer 33, the baseband processor 32 of the communication unit 1 sends a message for clearing the ACL link to the CD player 2-1.

In step S44, the baseband processor 62 of the CD player 2-1 receives the message for clearing the ACL link. In step S45, on the basis of a command given by the control microcomputer 55, the baseband processor 62 of the CD player 2-1 sends a response indicative of the reception of the ACL link clearing message to the communication unit 1.

In step S19, the baseband processor 32 of the communication unit 1 receives the response (indicative of the reception of the ACL link clearing message) from the CD player 2-1, upon which the processing comes to an end.

If no CD player enabled for voice reception is found in step S4, it indicates that voice data transmission is disabled, and therefore the processing comes to an end.

Thus, when the connection has been established with the CD player 2-1 which receive voice data, the communication unit 1 can interrupt the CD player 2-1 by sending the inputted voice data to the CD player 2-1.

In the above embodiment, the CD player 2 is adapted to unconditionally enable the interruption by voice data. The present invention is not limited to this arrangement. For example, a selector button may be arranged on the CD player 2 for allowing the user of the CD player 2 to permit the interruption of the CD player 2 by externally inputted voice data.

In the above embodiment, the CD player 2-1 is adapted to function as the wireless headphones of the communication unit 1. It will be apparent that, if two Bluetooth communication devices each have both a microphone and headphones, these two devices may be made function as transceivers by using the voice communication of SCO link.

In the above embodiment, the operation was described in which the reproduction of music data is interrupted by voice data. The present invention is not limited to this arrangement. For example, the displaying of images, still or moving, by the user on his or her mobile terminal may be interrupted by emergency news (about earthquakes, accidents, and so on) for example in the form of text or voice, so that the user can acknowledge the above-mentioned emergency news.

The above-mentioned sequences of processes may be executed by hardware but they may also be executed by software. The execution by software is supported by a computer in which the programs constituting this software are stored in a dedicated hardware storage device or a general-purpose personal computer for example in which these programs are installed from a program storage medium.

The program storage medium storing the programs which are installed in a general-purpose personal computer for example to be made executable by the computer is a package medium constituted by the magnetic disk 42 (including floppy disk), the optical disk 43 (including CD-ROM (Compact Disk Read Only Memory) and DVD (Digital Versatile Disk)), the magneto-optical disk 44 (including MD (Mini Disk)), or the semiconductor memory 45 or the program storage medium is constituted by a hard disk for example which stores the programs on a temporary or permanent basis. As required, the programs are stored in the program storage medium by use of wired or wireless communication medium such as a local area network, the Internet, or digital satellite broadcasting via such interface as router or modem.

The steps describing the programs provided by the above-mentioned program storage medium include not only processes:which are executed in the described sequence in a time-dependent manner but also processes which are executed in parallel or discretely.

It should be noted that term "system" herein denotes an entire apparatus constituted by a plurality of devices.

As described and according to the information reproducing apparatus, the information reproducing method, and the program storage medium associated with the present invention, a procedure for connection between a communication device and an information reproducing device is executed and, on the basis of the result of this execution, the information reproducing device receives data from the communication device. When, on the basis of the result of the connection procedure, the acceptance of connection is sent from the information reproducing device to the communication device, the output to the headphones is switched from the data to be reproduced from a recording medium to the data received from the communication device. Consequently, the information reproducing device can surely receive the data from the communication device even midway in the reproduction of data from the recording medium at any place.

While the preferred embodiments of the present invention have been described using specific terms, such description is for illustrative purposes only, and it is to be understood that changes and variations may be made without departing from the spirit or scope of the appended claims.

What is claimed is:

1. An information reproducing apparatus for reproducing data stored in a recording medium loaded in said information reproducing apparatus, comprising:

a connecting means for executing a connection procedure for making connection with a communication device;

a receiving means for receiving data supplied from said communication device on the basis of a result obtained by the execution of said connection procedure by said connecting means;

a sending means for sending a notification to said communication device of an acceptance of the connection on the basis of the result obtained by the execution of the said connection procedure by said connecting means; and a switching means for switching, when the sending of said notification by said sending means has completed, an output of said information reproducing apparatus from data reproduced from said recording medium to data received by said receiving means.

2. The information reproducing apparatus according to claim 1, further comprising:

a selecting means for selecting the execution of said connection procedure;

wherein said sending means sends said notification to said communication device on the basis of a result of the selection made by said selecting means.

3. The information reproducing apparatus according to claim 1, wherein the data reproduced from said storage medium and the data supplied from said communication device are voice data.

4. The information reproducing apparatus according to claim 1, wherein the data reproduced from said storage medium and the data supplied from said communication device are image data.

5. An information reproducing method for use in an information reproducing apparatus for reproducing data stored in a recording medium loaded in said information reproducing apparatus, said information reproducing method comprising the steps of:

executing a connection procedure for making connection with a communication device;

receiving data supplied from said communication device on the basis of a result obtained by the execution of said connection procedure by said connecting means;

sending a notification to said communication device of an acceptance of the connection on the basis of the result obtained by the execution of the said connection procedure by said connecting means; and switching, when the sending of said notification by said sending means has completed, an output of said information reproducing apparatus from data reproduced from said recording medium to data received by said receiving means.

6. A program storage medium storing a computer-readable program for controlling an information reproducing apparatus for reproducing data stored in a recording medium loaded in said information reproducing apparatus, said computer-readable program comprising the steps of:

executing a connection procedure for making connection with a communication device;

receiving data supplied from said communication device on the basis of a result obtained by the execution of said connection procedure by said connecting means;

sending a notification to said communication device of an acceptance of the connection on the basis of the result obtained by the execution of the said connection procedure by said connecting means; and switching, when the sending of said notification by said sending means has completed, an output of said information reproducing apparatus from data reproduced from said recording medium to data received by said receiving means.

* * * * *